United States Patent Office 3,161,670
Patented Dec. 15, 1964

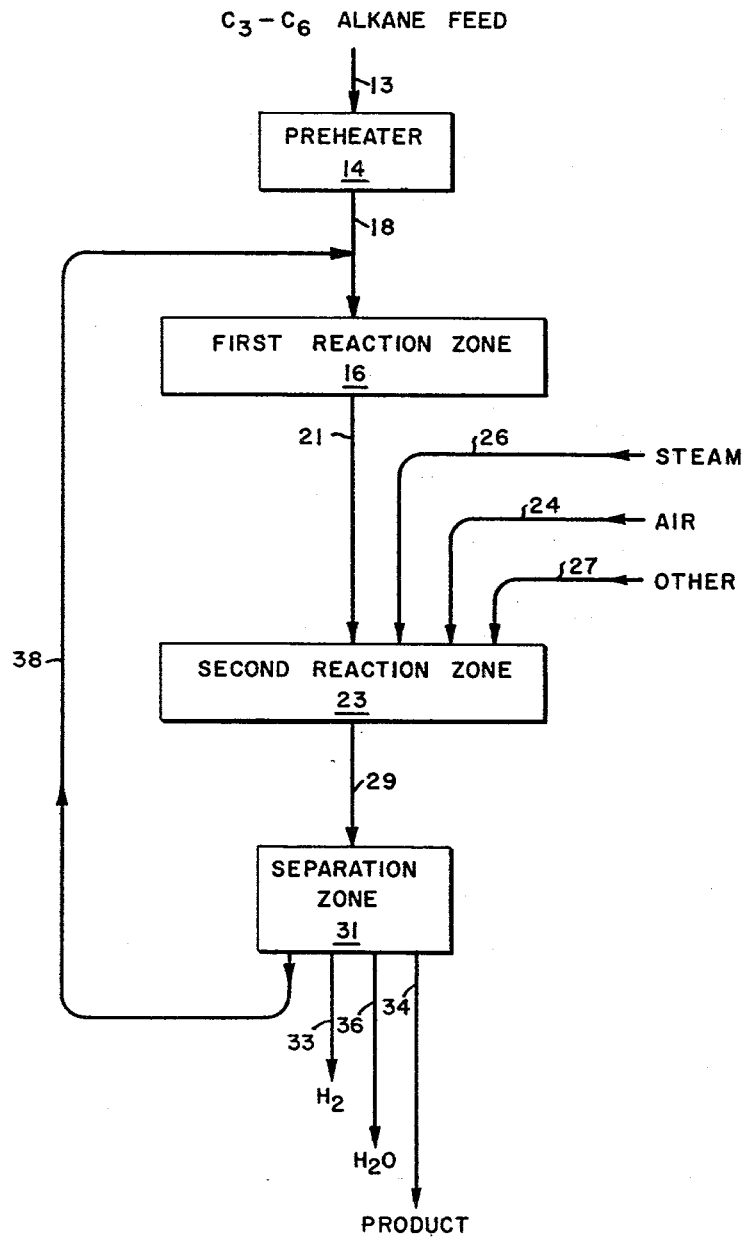

3,161,670
PREPARATION OF OLEFINIC COMPOUNDS
Charles R. Adams, Oakland, and Thomas J. Jennings, Lafayette, Calif., assignors to Shell Oil Company, New York, N.Y., a corporation of Delaware
Filed Dec. 12, 1960, Ser. No. 75,222
8 Claims. (Cl. 260—465.3)

This invention relates to a process for the catalytic conversion of organic compounds, more specifically $C_3$ to $C_6$ alkanes, to olefinic compounds. More particularly, it relates to an integrated process of this type wherein no separation of products is required between a first stage of dehydrogenation to an alkene and a second stage of catalytic oxidative dehydrogenation of the alkene.

It is well known in the art to produce butylene from butane through catalytic cracking-dehydrogenation. Such reaction is essentially endothermic and results as in the case of the well known Houdry Process, for example, in the production of a product stream containing chiefly butylenes, unreacted butane, some butadiene and free hydrogen. This stream has in the past been treated to remove hydrogen prior to utilization of the hydrocarbons in other manufacturing processes, such as, for example, in the production of butadiene by catalytic dehydrogenation of butadiene by catalytic dehydrogenation of the butylene for synthetic rubber production.

Moreover, the conversion of butylenes to the diolefin butadiene by an oxidative dehydrogenation reaction has recently been proposed. Thus, in a copending application of Hearne et al., Serial No. 20,556 filed April 7, 1960, now U.S. Patent No. 2,991,320, issued July 4, 1961, for example, there is taught the use of bismuth compounds as catalysts in the presence of free oxygen gas for the oxidative dehydrogenaiton of a $C_4$ stream comprising as major constituent butylene(s) along with some butane, most of the latter going along without reacting but forming more or less of an inert diluent in the process. The prospect of allowing hydrogen as free gas to be fed to such an oxidative dehydrogenation process has been discounted as being obviously too dangerous and also being too exothermic as to warrant serious consideration or investigation.

It has also recently been proposed to convert propylene and isobutylene to acrolein and methacrolein, respectively, by reaction with oxygen in the presence of certain bismuth-containing catalysts, such as bismuth molybdate.

The invention will be described in more detail with reference in part to the accompanying drawing wherein the sole figure is a diagrammatic representation of an integrated 2-stage process for converting a $C_3$ to $C_6$ alkane feed to corresponding alpha,beta-olefinic aldehydes, nitriles, and conjugated diolefins.

It has now been found that lower alkenes admixed with free hydrogen, as produced from the corresponding alkanes by catalytic dehydrogenation or other methods, can be oxidatively dehydrogenated with the removal of two more hydrogen atoms by reacting with free oxygen in the presence of a bismuth oxide-containing catalyst. The alkenes which contain a methyl group attached to an olefinic carbon have the methyl group changed to a —CHO group, while an attached ethyl group becomes another olefinic group. When the oxidative dehydrogenation is carried out in the presence of ammonia, the indicated methyl group is converted at least in part to a —CN group.

Now, in accordance with the present invention, it has been found that the expensive and time-consuming step of separating the hydrocarbons from the free hydrogen gas in the butane dehydrogenation effluent can be eliminated when the oxidative dehydrogenation is carried out in the presence of a bismuth-containing catalyst. In other words, the invention provides means whereby stage one of the catalytic dehydrogenation of butanes to butylenes can be combined directly with stage two of the catalytic oxidative dehydrogenation of butylenes to butadienes without any separation step for the first-stage products intervening therebetween. Moreover, the presence of the free hydrogen as an inert diluent provides for improved temperature control of the second-step highly exothermic oxidative dehydrogenation step. This is particularly advantageous when this stage of the process is carried out in the presence of a fluidized catalyst mass in that this inert gas provides efficient fluidization of the catalyst. The invention will be more clearly understood from a consideration of the following description taken in conjunction with the drawing, the sole figure of which represents a preferred embodiment thereof in the form of a simplified flow diagram delineating the first and second stages of the catalytic reactions as well as the means provided for the separation and removal of the products therefrom.

It will be apparent to those familiar with the art of combustion that the teachings of the present disclosure should be carefully followed and the precautions prescribed herein should be closely observed. The free hydrogen present as a gas in the product stream from the first catalytic conversion zone has now been discovered to function only as an inert diluent in the second catalytic conversion zone wherein free oxygen is also present along with an oxidative dehydrogenation catalyst of a bismuth compound, provided that certain fundamental principles are adhered to. This is true even though the oxidative deydrogenation reaction is essentially exothermic and it may be for this reason, along with the conventional thought that mixing oxygen gas with hydrogen gas may be inherently dangerous, that the addition of hydrogen to the hydrocarbon reactants in the oxidative dehydrogenation zone has not been hereto contempulated since the reaction of $H_2$ with $O_2$ is also highly exothermic. For example, where molybdic oxide catalyst, per se, (no bismuth) is used, reaction occurs between the hydrogen and oxygen. Moreover, the conventional thinking has been that the presence of additional hydrogen should be avoided in a catalytic dehydrogenation reaction, since added free hydrogen would tend to shift the reaction equilibrium in the reverse direction.

For example, it is important to exclude strong oxidation catalysts from the second stage reaction zone. Such proscription includes carryover of the cracking-dehydrogenation chromia-alumina catalyst generally used in the first stage-conversion zone. The presence of such materials as iron or the oxides thereof is to be avoided or minimized and if reaction vessels or conduits in connection with the second conversion zone are fabricated of steel or iron-base materials, they should be lined with materials known to have no oxidatively catalytic properties. Moreover, the amounts of $H_2$ gas present as diluent and the amounts of $O_2$ gas present as oxidant should be controlled in such manner that they do not become major components in the mixture of hydrocarbon reactants, but such control is generally found to be quite simple and will be manifest to those skilled in the art of chemical reactions. Practically any inert gas diluent may be used in the reaction, for example, nitrogen, steam, argon and the like.

Referring now in detail to the sole figure of the drawing, there is provided $C_3$–$C_6$ alkane feed through line 13 into preheater 14 wherein the feed is heated prior to entry into first reaction zone 16 through line 18. The alkane feed passes over a catalyst bed (not shown) wherein initial dehydrogenation takes place and a substantial portion of the alkane feed is dehydrogenated to corresponding alkene and $H_2$, which products along with unreacted alkane are passed via line 21 into second reaction zone 23. Oxygen-containing gas, such as air, steam, and other materials such as ammonia, if desired, are admitted through lines 24, 26 and 27, respectively. The unreacted alkane along with the alkene product and hydrogen from the first reaction zone as well as air and steam are passed through the oxidative dehydrogenation catalyst (not shown) in second reaction zone 23, wherein the alkene is oxidatively dehydrogenated to further unsaturated products such as, for example, alpha,beta-olefinic aldehyde, alpha,beta-olefinic nitrile, or 1,3-diolefin. The products as well as the unreacted feed and the diluents are carried through line 29 into separation zone 31 wherein hydrogen is released for further use through line 33, product is removed through line 34, and water is removed from the system via line 36. The unreacted feed is recycled through line 38 into line 18 and first reaction zone 16.

The following description of processing details in the practice of the present invention constitutes a preferred embodiment thereof; however it is not intended to limit or otherwise restrict the scope of the invention to those exact quantities and conditions now set forth, it being quite obvious to those skilled in the processing art that certain variations and modifications may be employed without departure from the true spirit and scope of the invention as delineated in the appended claims.

As illustrative of one embodiment of the present invention, technically pure normal butane is fed through line 13 into preheater 14 wherein it is heated to approximately the desired reaction temperature which is normally between about 1000 and 1250° F. The preheated butane vapors, which are preferably dry and free of oxygen, are then passed through line 18 into the first reaction zone 16. The reactor comprising the principal element of the first reaction zone will hereinafter be referred to for purposes of convenience as reactor A and this, in turn, may be one of several connected in parallel. Reactor A is provided with a fixed foraminous bed of catalyst granules, the preferred catalyst being $Cr_2O_3$ supported on a refractory aluminous carrier. In the case illustrated the catalyst contains about 18% $Cr_2O_3$ incorporated by impregnation onto said $Al_2O_3$ support. The reaction in reactor A is endothermic. The pressure in this reactor should be above atmospheric but should not exceed about 5 atmospheres. In the illustrated case it is about 20 p.s.i.g.

The space velocity should be adjusted in accordance with the activity of the catalyst and the temperature and pressure so at least about 45% of the normal butane is reacted. Under these conditions the catalytic dehydrogenation is rather selective to the production of butylene and only minimum small amounts of butadiene are formed in the first reaction zone. This is important to the economy of the over-all process.

Thus for example, at a conversion of 50% the selectivity to butylene is 67%, and in the case illustrated there is produced per barrel of butane (205 pounds) per pass about 68 pounds of butylene, 8 pounds of butadiene and 612 standard cubic feet of dry gas, the remainder being unreacted butane. A typical analysis of the dry gas is 63% hydrogen, 18% methane, 10% ethane and 9% $C_3$ hydrocarbons.

This first-stage effluent stream is passed through line 21 into second reaction zone 23, the reactor therein being referred to hereinafter as reactor B. Air or oxygen-containing gas is admitted through line 24 into the second reaction zone or, alternatively, the air may be mixed with the feed to reactor B prior to admission thereto. The amount of oxygen-containing gas, e.g., air, is adjusted so that there is from about 0.3 to 1.5 moles of oxygen per mole of butylene in the feed. It will be obvious to those skilled in the art of automatic control equipment that this relative amount of air may be metered automatically depending on the on-the-spot butylene analysis. The preferred amount is around 1 mole or somewhat less per mole of butylene. While the mixture in reactor B may also include some added steam, such steam may be advantageous but is not essential to the reaction or to the process.

Reactor B suitably contains, for purposes of example, a catalyst in a number of vertically disposed tubes and a suitable coolant is circulated on the outside of the tubes to remove exothermic heat of the reaction and to maintain a suitable reaction temperature. When operating with a fixed bed of catalyst such as this, it is preferred to maintain the oxygen concentration in the incoming mixture to the reactor below about 12% volume when hydrogen is absent and in lesser amounts when it is present, and/or the concentration of hydrocarbons at least about 12% volume in order to avoid limits which might be hazardous. It must be remembered that the explosive limits of hydrogen and oxygen are generally quite wide and the oxygen concentration at any point in the reactor should be maintained below such explosive limit. The remainder may be diluent such for instance, as nitrogen, steam, paraffinic vapors, and so forth. It will also be understood that a fluidized catalyst bed may also be used. In accordance with the invention, $H_2$ may be present as long as the catalytically active material is a bismuth-containing catalyst; such $H_2$ behaving like an inert diluent under such controlled conditions. In fact, in its broadest aspects, the invention contemplates the use of a bismuth-containing catalyst for exothermic reactions wherein hazardous limits may be approached and wherein $H_2$ is present along with $O_2$ in considerable quantities.

The catalyst used in reactor B must then, of necessity, contain bismuth in addition to oxidation catalysts such as molybdic oxide, for example, which alone promote the reaction of hydrogen with oxygen. It may also contain phosphorus, tungsten, and/or molybdenum. A preferred catalyst contains tungsten and/or molybdenum in an amount varying from about 0.3 to about 25 atoms per atom of bismuth. Up to about 50% of the bismuth may be substituted by Cd, Pb, Sb, Sn or Ag, although the catalyst is preferably Bi, with or without some arsenic as selectivity promoter, and some of the dehydrogenating metals already mentioned. All these metals are in combination with oxygen, the amount being dependent upon the oxidation-reduction potential of the environment during their use. The possibilities of formation of solid solutions and of interaction between the components are not precluded.

The active catalyst materials may then be diluted with inert materials, e.g., silica, alumina, or the like, and are also preferably applied with a suitable support or carrier such, for instance, as silica gel, Alundum, kieselguhr, asbestos, firebrick, terra cotta, and so forth. In order to cut down the heat release per unit volume it is desirable to dilute the catalyst granules with granules of an inert material such as beads of fused silica or the like.

The catalyst in reactor B is preferably in the form of quite small particles, e.g., ⅛-inch diameter, and consequently with this fixed bed design there is an appreciable pressure drop across the reactor which may vary somewhat with time. The pressure on the intake side of the reactor is therefore adjusted such that the outlet pressure is essentially equal to the outlet pressure of reactor A.

When packing a fixed bed of the catalyst in the reactor it is recommended to fill the lower end of the reactor tubes for a short distance above the support means with a layer of coarse balls or pieces of inert material, e.g., ½ inch Alundum spheres, followed by layers of successively smaller size until a layer of inert solids only slightly larger than the catalyst particles is present. The catalyst is then filled in the tube on top of the bed of inert material.

The nominal reaction temperature is preferably below that in reactor A and in the range of about 650 to 1200° F., and preferably between about 850 and 1050° F. There is usually, however, a localized zone of somewhat higher temperature than the nominal temperature.

It is important that the space velocity be maintained sufficiently low in accordance with the activity of the catalyst, the pressure, and the temperature so that at least 95% of the oxygen is reacted. This condition may be assured by starting with a low space velocity and then gradually increasing the space velocity until unreacted oxygen appears in the effluent. While it is important to obtain complete or at least 95% reaction of the oxygen, the conversion of the butylene in the reactant mixture may vary. However, it is recommended that the severity, which increases with increasing temperatures and pressures and decreasing space velocity, be adjusted to obtain at least 60% conversion of the butylenes and preferably about 75 to 95%. Oddly enough, higher temperatures leading to such high conversions also lead to the best selectivities and it is largely the improved selectivity (i.e., moles of butadiene made per moles of butene reacted) that is responsible for the economic advantage of the over-all process.

The catalyst in the particular case is prepared by impregnating pellets of Alundum with an aqueous solution of ammonium tungstate, drying, impregnating with an aqueous solution of bismuth nitrate, drying, calcining at 1000° F. and then repeating these steps.

The products, diluents and unreacted feed materials are withdrawn from reactor B and transported to a separation zone wherein butadiene product is separated and passed to storage and eventual sale or further reaction in the petro-chemical industry. Conventional separation methods may be used and extractive distillation with sulfolane or with acetonitrile plus water, or even with acetone plus water is recommended. In the illustrated case, sulfolane is used and the recovery therefrom of the butadiene is excellent. The solvent is recovered and recycled in the process. Hydrogen and water (where steam is used as an inert diluent) are removed from the reaction zone and separated out in separation zone 31. Butylenes and unreacted butane are recycled through lines 38 and 18 to first reaction zone 19. Any minor amounts of organic oxygenated products such as aldehydes, ketones or acids which may be formed may readily be removed in the separation zone by well-known treating and removal methods.

It is obvious from an examination of the drawing and from a consideration of the foregoing process description that $H_2$ is not removed from the products from the first reaction zone but is, instead, passed through the second reaction zone along with the feed and other inert diluents therein. It has been found that this hydrogen plays no adverse role in the reaction so long as the catalytic material is a bismuth-containing catalyst. This elimination of a $H_2$ removal step intermediate the two reaction zones constitutes a most important saving in the processing of butadiene from butane feed and in no way impedes the oxidative dehydrogenation process occurring in the second reaction zone as may have been heretofore strongly presumed.

The following specific examples are offered in further exposition of the invention. It will be noted that a mixture of an inert gas such as argon or helium has been used in conjunction with oxygen as a "synthetic air"; nitrogen not being used because of its intereference with carbon monoxide determinations in the present analysis. In other words, similar results are obtainable with the use of air instead of the aforesaid mixtures.

Example I

Hydrogen was added to a mixture of oxygen, argon, and 1-butene and passed over a bismuth molybdate catalyst having a Bi/Mo ratio of 1. The catalyst was prepared by mixing a solution of bismuth nitrate with ammonium molybdate, adding ammonia to PH 5.5, drying the precipitate at 120° C. and calcining at 500° C. The temperature of the reactor was raised from room temperature to 530° C. with varying amounts of hydrogen added. No consumption of hydrogen was noted, although the conversion of 1-butene and the selectivity to butadiene were found to be representative for this catalyst under conditions wherein hydrogen is absent. The following results were obtained at 525° C. with a mixture of 17% molar $H_2$, 17% $C_4H_8$, 13% $O_2$ and 52% Ar at a total gas hourly space velocity of 27,600:

Butylene conversion _____ percent__  66
Oxygen conversion _____ do____  51
Butadiene selectivity _____ do____  88
$H_2$/Ar ratio:
   In product _____  0.320
   In feed _____  0.327

A similar run was made at 540° C. without hydrogen present and with a total gas hourly space velocity of 18,000, yielding the following results:

Percent
Butylene conversion _____ 71
Oxygen conversion _____ 62
Butadiene selectivity _____ 89

From these results, as well as those from other experiments, it is readily seen that at the same total gas hourly space velocity and temperature, the same butylene and oxygen conversions may be obtained in the presence of hydrogen, as well as in its absence.

Example II

A feed containing 14% propylene, 14% oxygen, with and without the addition of 14% hydrogen, the remainder being helium, was passed over a bismuth molybdate catalyst prepared in a manner similar to that described in Example I. The following results were obtained at 500° C. and a total gas hourly space velocity (measured at room temperature) of 4200:

|  | With Hydrogen | Without Hydrogen |
|---|---|---|
| Propylene conversion | 44 | 44 |
| Oxygen conversion | 71 | 74 |
| Selectivity to acrolein | 88 | 88 |
| $H_2$/He ratio: |  |  |
|   In feed | 0.270 |  |
|   In product | 0.262 |  |

Example III

In a similar determination hydrogen was shown to have negligible effect on the reaction of propylene with ammonia and oxygen to yield acrylonitrile. A feed containing 9% propylene, 9% ammonia, 14% oxygen, with and without the addition of 9% hydrogen, and made up to 100% with helium was passed over a bismuth molybdate catalyst prepared as described in Example I. The following results were obtained at 500° C. and a total gas hourly space velocity of 3150:

|  | With Hydrogen | Without Hydrogen |
|---|---|---|
| Propylene conversion | 37 | 36 |
| Oxygen conversion | 89 | 82 |
| Selectivity to acrylonitrile (basis $C_3H_6$) | 50 | 46 |
| Selectivity to acrolein (basis $C_3H_6$) | 43 | 49 |
| $H_2$/He ratio: |  |  |
|   In feed | 0.169 |  |
|   In product | 0.165 |  |

The data indicate an improvement in selectivity to acrylonitrile in the presence of hydrogen. However this may be due to a slight variation of the ammonia to $C_3$ ratio in the feed.

It will be appreciated that while n-butane may be dehydrogenated to butadiene, in accordance with the present invention, propane may be converted to propylene and then to acrolein and acrylonitrile, while isobutane may be converted to isobutylene and then to methacrolein and methacrylonitrile. Moreover the invention contemplates an oxidative dehydrogenation of olefinic compounds prepared in a first-stage reaction from $C_3$ to $C_6$ alkanes; the invention not being limited merely to $C_3$ and $C_4$ hydrocarbon streams. Furthermore, the first stage dehydrogenation of the present invention may also comprise a thermal as distinguished from a catalytic process. However the invention does contemplate and require the use of a catalytic material containing bismuth in a second-stage dehydrogenation to the final olefinic compound, such as, for example, butadiene, methyl butadiene (isoprene), acrolein and acrylonitrile.

While in the foregoing a $C_3$ to $C_6$ alkane feed is specified, it is to be understood that the invention is directed to a feed comprising one or more hydrocarbons within the $C_3$ to $C_6$ range, either singly or in whatever combination found desirable, depending on such factors, for example, as the feed streams available and the final products desired.

Moreover the invention contemplates a process wherein acrylonitrile may be synthesized from propylene, oxygen and ammonia which may or may not contain hydrogen as an impurity. For example, in the manufacture of ammonia by the Haber process, some hydrogen may remain with the ammonia product as impurity. By means of the present invention it no longer is necessary to further purify the ammonia product, but this may be fed to the acrylonitrile synthesis directly. In certain circumstances it may be found that the propylene used in the oxidative dehydrogenation to acrylonitrile may be relatively pure, hence the present invention enables the use of ammonia in the process despite its contamination with hydrogen.

We claim as our invention:

1. The process for converting a $C_3$ to $C_6$ alkane to a conversion product having a higher carbon to hydrogen ratio than said alkane, which comprises dehydrogenating said alkane to a reaction mixture predominating in the corresponding $C_3$ to $C_6$ alkene and a corresponding proportion of free hydrogen in a first reaction zone, and then reacting said reaction mixture comprising said alkene and free hydrogen with uncombined oxygen at a temperature in the range of from about 650 to 1200° F., and at a space velocity to convert at least 95% of said oxygen, in the presence of a catalytically active material consisting essentially of bismuth oxide associated with an oxide of an element selected from the group consisting of phosphorus, molybdenum, and tungsten, in a second reaction zone, thereby converting said alkene to a conversion product having a higher carbon to hydrogen ratio in the absence of any substantial hydrogen conversion in said second reaction zone.

2. Process in accordance with claim 1 wherein said catalytically active material is bismuth tungstate.

3. Process in accordance with claim 1 wherein said catalytically active material is bismuth molybdate.

4. Process for the production of butadiene from butane, which comprises catalytically dehydrogenating n-butane to a reaction mixture predominating in butene and a corresponding proportion of free hydrogen in a first reaction zone, and then reacting said reaction mixture comprising butene and free hydrogen with uncombined oxygen at a temperature in the range of from about 650 to 1200° F., and at a space velocity to convert at least 95% of said oxygen, in the presence of a catalytically active material consisting essentially of bismuth oxide associated with an oxide of an element selected from the group consisting of phosphorus, molybdenum, and tungsten, in a second reaction zone, thereby converting said butene to butadiene in the absence of any substantial hydrogen conversion.

5. Process for the production of acrolein from propane, which comprises catalytically dehydrogenating propane to a reaction mixture predominating in propylene and free hydrogen in a first reaction zone and then reacting said reaction mixture comprising propylene and hydrogen with uncombined oxygen at a temperature in the range of from about 650 to 1200° F., and at a space velocity to convert at least 95% of said oxygen, in the presence of a catalytically active material consisting essentially of bismuth oxide associated with an oxide of an element selected from the group consisting of phosphorus, molybdenum, and tungsten in a second reaction zone, thereby oxidatively converting said propylene to acrolein in the absence of any substantial hydrogen conversion in said second reaction zone.

6. Process for the production of methacrolein from isobutane, which comprises catalytically dehydrogenating isobutane to a reaction mixture predominating in isobutylene and a corresponding proportion of free hydrogen in a first reaction zone and then reacting said reaction mixture comprising isobutylene and free hydrogen with uncombined oxygen at a temperature in the range of from about 650 to 1200° F., and at a space velocity to convert at least 95% of said oxygen in the presence of a catalytically active material consisting essentially of bismuth oxide associated with an oxide of an element selected from the group consisting of phosphorus, molybdenum, and tungsten in a second reaction zone, thereby oxidatively converting isobutylene to methacrolein in the absence of any substantial hydrogen conversion in said second reaction zone.

7. Process for the production of acrylonitrile from propane which comprises catalytically dehydrogenating propane to a reaction mixture predominating in propylene and a corresponding proportion of free hydrogen in a first reaction zone, and then reacting said reaction mixture comprising propylene and free hydrogen with molecular oxygen and ammonia at a temperature in the range of from about 650 to 1200° F. and at a space velocity to convert at least 95% of said oxygen in the presence of a catalyst comprising a catalytically active material consisting essentially of bismuth oxide associated with an oxide of an element selected from the group consisting of phosphorus, molybdenum, and tungsten in a second reaction zone, thereby converting said propylene to acrylonitrile in the absence of any substantial hydrogen conversion in said second reaction zone.

8. Process for the production of methacrylonitrile from isobutane which comprises catalytically dehydrogenating isobutane to a reaction mixture predominating in isobutylene and a corresponding proportion of free hydrogen in a first reaction zone and then reacting said reaction mixture comprising isobutylene and free hydrogen with molecular oxygen and ammonia at a temperature in the range of from about 650 to 1200° F. and at space velocity to convert at least 95% of said oxygen in the presence of a catalyst comprising a catalytically active material consisting essentially of bismuth oxide associated with an oxide of an element selected from the group consisting of phosphorus, molybdenum, and tungsten, in a second reaction zone, thereby converting said isobutylene to methacrylonitrile in the absence of any substantial hydrogen conversion in said second reaction zone.

References Cited by the Examiner

UNITED STATES PATENTS

| | | | |
|---|---|---|---|
| 2,060,356 | 11/36 | Wietzel et al. | 260—683.3 |
| 2,143,380 | 1/39 | Klein et al. | 260—683.3 |
| 2,904,580 | 9/59 | Idol | 260—465.3 |
| 2,991,320 | 7/61 | Hearne et al. | 260—680 |
| 2,991,322 | 7/61 | Armstrong et al. | 260—680 |

LEON ZITVER, *Primary Examiner.*

CHARLES B. PARKER, *Examiner.*